United States Patent [19]
Kurita

[11] Patent Number: 4,896,148

[45] Date of Patent: Jan. 23, 1990

[54] DISPLAY APPARATUS

[75] Inventor: Kikuo Kurita, Hirakata, Japan

[73] Assignee: Minolta Camera Kabushiki Kaisha, Osaka, Japan

[21] Appl. No.: 94,143

[22] Filed: Sep. 8, 1987

[30] Foreign Application Priority Data

Sep. 8, 1986 [JP] Japan ............................... 61-211197

[51] Int. Cl.$^4$ ............................................ G06F 3/153

[52] U.S. Cl. .................................. 340/731; 340/750; 340/709

[58] Field of Search ............... 340/721, 731, 735, 750, 340/748, 709, 799

[56] References Cited

U.S. PATENT DOCUMENTS

Re. 31,200 4/1983 Sukonick et al. .................. 340/731
3,911,420 10/1975 Lampson ............................ 340/731
4,314,244 2/1982 Demke et al. ....................... 340/731
4,550,386 10/1985 Hirosawa et al. ................... 340/721

OTHER PUBLICATIONS

Boyd et al, "Text Editing Display System with Vertical Expansion of Selected Lines for Highlighting", IBM Technical Disclosure Bulletin, vol. 21, No. 11, Apr. 1977, pp. 4339–4340.

*Primary Examiner*—Alvin Oberley
*Attorney, Agent, or Firm*—Price, Gess & Ubell

[57] ABSTRACT

A display apparatus for displaying character information in various modes. This display apparatus allows the display modes to be changed by changing a character size and a display start address without changing the relative position of a cursor.

6 Claims, 7 Drawing Sheets

S MODE TO R MODE FLOWCHART (R MODE → S MODE)

DISPLAY APPARATUS

BACKGROUND OF THE INVENTION (1) Field of the Invention

The present invention relates to a display apparatus mounted on office automation machinery such as the word processor, personal computer, electronic typewriter and the like, and particularly a display apparatus for use on compact office automation machinery.

(2) Description of the Prior Art

Office automation machinery such as the word processor, personal computer, electronic typewriter and the like have made rapid progress in recent years as the central instrument for streamlining office work.

In particular, demands for compact machinery are increasing today and the CRT display which takes up a large installation space is being replaced by flat panel type displays requiring less space. Known panel type displays include a liquid crystal display, an EL display utilizing electroluminescence, and a plasma display utilizing discharge of plasma gas. These panel type displays have a smaller number of dots on the screen and therefore show a smaller number of characters per screen than the CRT display.

The latest office automation machinery of a relatively sophisticated class offer a diversified range of mode choice. Some of them are equipped with functions including a split screen mode wherein the screen is divided into two or more sections to allow editing work to be carried out on each screen section independently, and a help menu mode wherein handling methods are called to the screen when the operator forgets how to operate the machine. For these display modes it is desirable to have a large number of characters displayed on the screen.

As means for increasing the number of characters displayed, it is conceivable to reduce the size of characters and increase the number of lines thereby to increase the number of characters displayed per screen. A uniform increase in the number of lines would reduce the size of characters to an extent that the operator has difficulties in recognizing the characters, which constitutes a new drawback.

In order to eliminate this problem, it is desirable for the above panel type display to include means for varying the number of characters per screen according to purpose.

One of such means is to rewrite character code data stored in the video RAM. However, this would entail the problem of complication in software processing and high cost.

SUMMARY OF THE INVENTION

A primary object of the present invention, therefore, is to provide a display apparatus incorporating a rational improvement for coping with various display modes.

Another object of the invention is to provide a display apparatus capable of display in various modes presenting characters in different sizes and numbers of lines without rewriting character code data stored in the video RAM.

A further object of the invention is to provide a display apparatus capable of various mode changes without changing a relative position of a reference point on the screen.

A still further object of the invention is to provide a display apparatus capable of coping with various display modes without changing a relative cursor position.

In order to fulfill the above objects, a display apparatus according to the present invention comprises a display device having a two-dimensional screen for displaying the character information; character data generating means for generating character data corresponding to the character information to be displayed; display mode judging means for judging a display mode for displaying the character information on the screen; operating means for operating a display start address for each display mode on the basis of a reference position on the screen; control means for controlling the character data generating means to generate a character font of a size necessary to each display mode; and display device drive means for causing the character information to be displayed in a selected mode on the screen in response to the character data generated by the character data generating means and the display start address operated by the operating means.

Specifically, the reference position on the screen is a cursor position.

Further, the character data generating means stores different size character fonts and generates a character font designated by a font select command from the control means.

The character data generating means may have an external memory, the control means being operable to cause a high speed transfer of font bit data from the external memory to an internal memory, whereby the character data stored in the internal memory are rewritten for a selected character size.

In one preferred embodiment of the invention, a display apparatus comprises a display device having a two-dimensional expanse for displaying the character information; a video memory for generating character code data; character data generating means for generating selected character data in response to the character code data; parallel to serial conversion means for converting the character data into serial data for input to the display device; a display sequencer for providing controls to determine a character to be displayed on the display device and to determine a position on the display device at which the character is displayed; a CPU for calculating a display start address for each display mode on the basis of a cursor position, rewriting a display start address in the display sequencer, and transmitting a character font size designating signal to the character data generating means; and a display device drive means for causing the character information to be displayed in response to a synchronizing signal received from the display sequencer and a serial signal received from the parallel to serial conversion means.

According to the above construction, when the operator selects a certain display mode by pressing keys, the CPU recognizes the selection, instructs the character data generating means to select a suitable character font size. In parallel with this, the CPU calculates a display start address on the basis of a cursor position, and input the address to the display sequencer. Consequently, character data designated by the display start address appear on the display screen in the selected character size. In this case, the data are presented over a range available on the display screen, using the cursor position for the basis in order to involve no change in the cursor position. Since tis display is effected without rewriting contents of the video memory, the apparatus according to the present invention reduces the load on software and provides an advantage of low cost.

BRIEF DESCRIPTION OF THE DRAWINGS

These and other objects or features of the present invention will become apparent from the following description of preferred embodiments thereof taken in conjunction with the accompanying drawings, in which.

DETAILED DESCRIPTION OF THE INVENTION

The present invention will be described in detail hereinafter with reference to the drawings.

Figure 1:
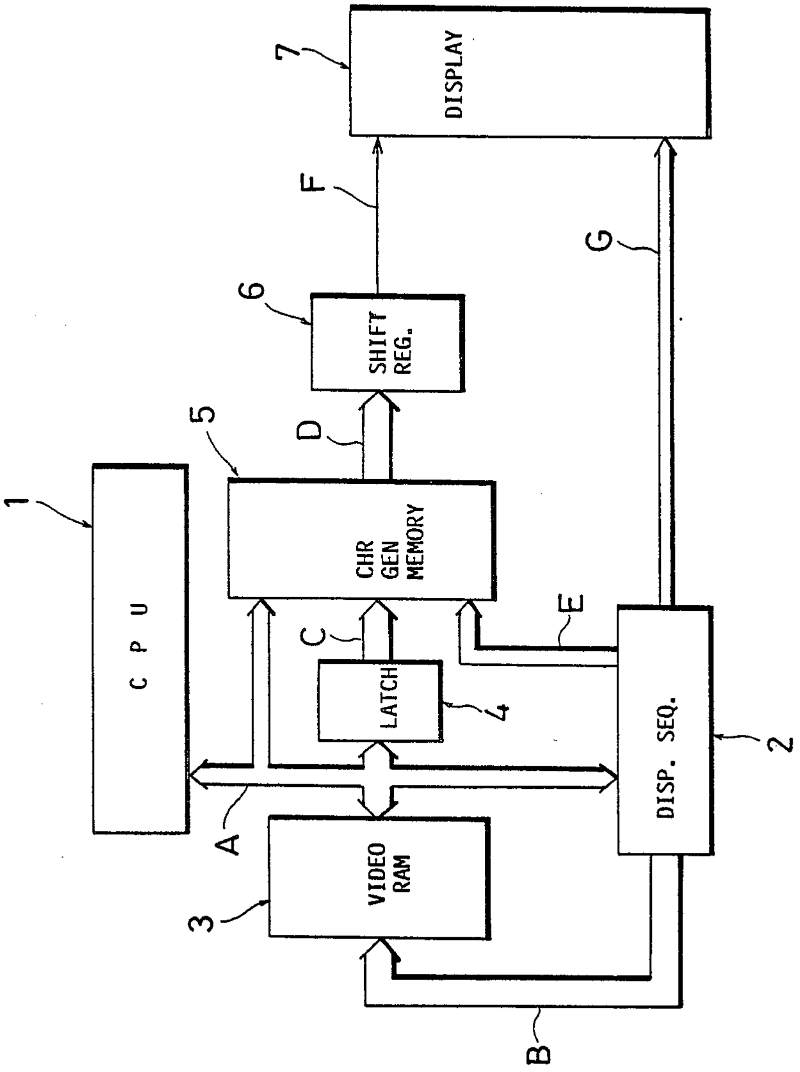
FIG. 1 is a block diagram of a display apparatus according to one embodiment of the present invention.

FIG. 1 is a block diagram of a display apparatus according to one embodiment of the invention. This display apparatus comprises a CPU 1, a display sequencer 2, a video RAM 3, a latch 4, a character generator memory 5, a shift register 6, and a display 7.

The CPU 1 is connected through a data bus A to the display sequencer 2, video RAM 3, latch 4 and character generator memory 5. The CPU 1 transmits a rewrite command regarding the number of lines to be displayed to the display sequencer 2, a character font select command to the character generator memory 5, and a character code data rewrite command to the video RAM 3. This character code data rewriting does not include rewriting of characters having different sizes. According to the present invention, when there is a request for different size characters to be displayed, the CPU 1 transmits the character font select command to the character generator memory 5 and the number of lines rewrite command to the display sequencer 2.

The display sequencer 2 transmits a character address signal to the video RAM 3 through a bus line B, a raster address signal to the character generator memory 5 through a bus line E, and a synchronizing signal to the display 7 through a signal line G. The character address signal corresponds to a character position on the screen of display 7. Upon receipt of this signal, the video RAM 3 outputs a character code data corresponding to a character address in the video RAM 3. The display sequencer 2 comprises an HD68451 manufactured by Hitachi, for example.

As described above, the video RAM 3 is accessible to the CPU 1 and the display sequencer 2. One display cycle period is divided into two parts, one of which is allocated for the access by the CPU 1 and the other for the access by the display sequencer 2.

The character code data output from the video RAM 3 are retained at the latch 4 during one display cycle, and are successively input to an address input terminal of the character generator memory 5 through a bus line C.

The character generator memory 5 receives, along with the character code data, the raster address signal from the display sequencer 2, and outputs character bit data corresponding to the two signals. The character generator memory 5 stores a multiplicity of character fonts including those of different size characters in particular. However, the character code data and raster address signals do not serve to the extent of selecting a character font size. The font size selection is effected by a font size select command output from the CPU 1.

The bit data output from the character generator memory 5 are applied to the shift register 6 through a data line D, where the bit data are subjected to parallel to serial conversion for input to the display 7 as a video signal. The display 7 shows characters determined by the video signal on the screen and in response to the video signal and to the synchronizing signal output from the display sequencer 2.

According to the above construction, the display mode is fixable to a selected mode and a change of characters for display is effected by a character code data rewrite command given from the CPU 1 to the video RAM 3. When the mode is changed to an input mode, edit mode, split screen mode or help menu mode, characters are displayed on the screen with a character size and the number of lines corresponding to the selected mode without rewriting the character code data and without changing the relative position of the cursor. This operation will be described next. The split screen mode is intended for carrying out editing work on each divided section of the screen independently. The help menu mode is for providing the operator with an operational guidance. In either mode, the greater the number of displayed line is, the more convenience is given to the operator. In the case of input mode and edit mode, on the other hand, the larger the character size is, the easier it is for the operator to work, advantageously with a small number of lines displayed on the screen.

To facilitate understanding, the following explanation will be limited to two display modes, the standard mode S and reduction mode R. The standard mode S here means a screen mode presenting a minimum number of lines on the screen of display 7 whereas the reduction mode R means a screen mode presenting a maximum number of lines.

The difference in arrangement between the standard mode S and reduction mode R lies in the number of dots (the number of rasters for one character) in the vertical direction of the character font and the number of lines shown on the screen of display 7.

As described hereinbefore, a plurality of character fonts of different character sizes are stored in the character generator memory 5, and a desired character size is selected upon input of a font select signal from the CPU 1. In parallel with the font selection, the CPU 1 transmits the number of lines rewrite command to the display sequencer 2.

Figure 2:
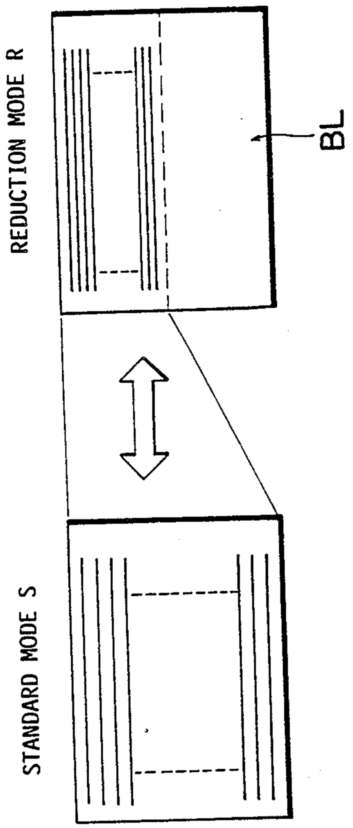
FIG. 2 is a view illustrating an example of mode change between a standard mode and a reduction mode.
Figure 3:
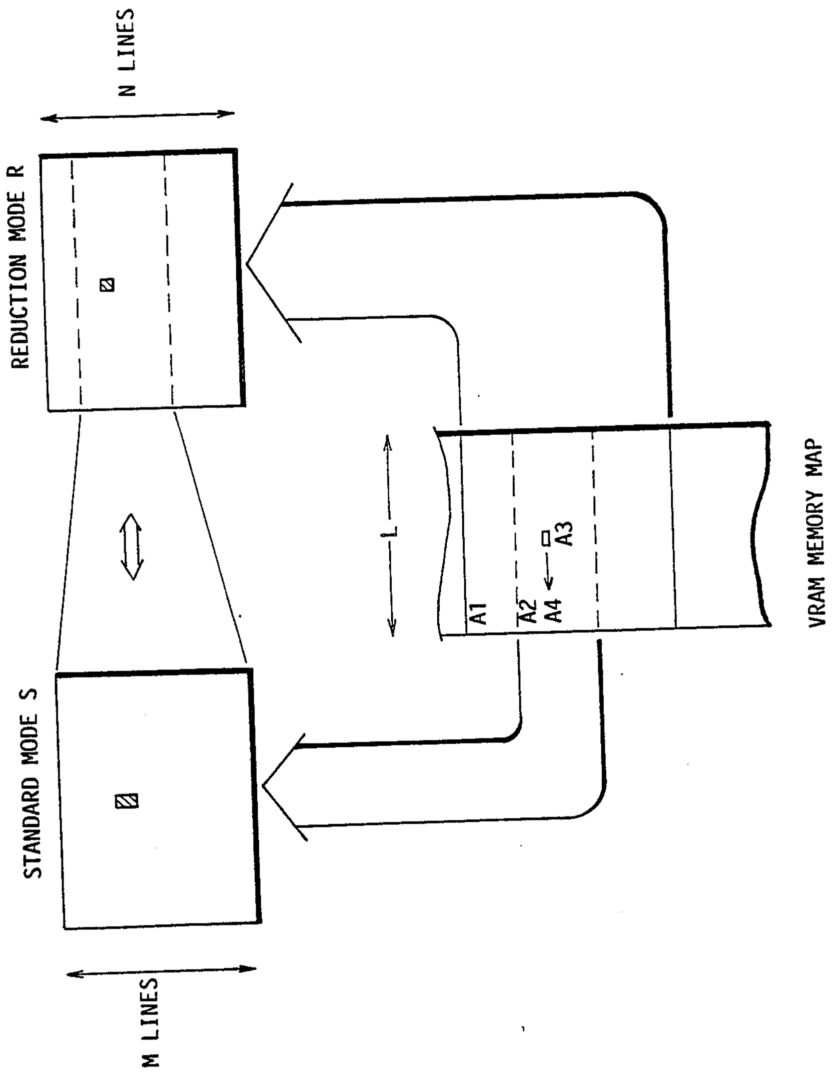
FIG. 3 is a view illustrating a relationship between a display screen and video RAM addresses at a mode changing time.

The rewriting of the number of lines is effected by rewriting a one character raster register, a number of lines register and a display start address register in the display sequencer 2. In other words, the number of scan lines necessary for forming one character is determined by rewriting the one character raster register, the number of lines arranged vertically is determined by rewriting the number of lines register, and a display start position is determined by rewriting the display start address register. FIG. 2 illustrates an example of mode change where the reduction mode R has a character size half the character size of the standard mode S. When the standard mode S is changed to the reduction mode R, the number of rasters for one character is halved and the number of lines doubled, thereby to form a blank space BL for displaying new characters input through an external input device. In the standard mode S, for example, the area for one character may be set to 8 by 12 dots, the entire screen area to 48 letters by 24 lines, and the character display area excluding the blank area to 32 letters by 16 lines. Then, the one character raster register is set to 12 and the number of lines register is set to 16. When the mode is changed from the standard mode S to the reduction mode R and an 8 by 6 dot character font is selected by the font select signal, for example, the one character raster register is set to 6 and the number of lines register to 32, whereby the character display area on the screen becomes 32 characters by 32 lines. The display start address is calculated on the basis of the cursor postion. The method of this calculation will be described with reference to FIG. 3 which illustrates a relationship between the display screen and the addresses in the video RAM at a time of mode change from the standard mode S to the reduction mode R. As shown in FIG. 1, the video RAM retains certain character code data corresponding to the reduction mode R. However, a display in the standard mode S is effected without changing the cursor position on the screen and contents of the video RAM, by moving the display start address register from A1 to A2. Assuming that A1 represents the display start address for the reduction mode R provided there is no blank lines on the display screen, A3 represents the cursor address, N represents the number of lines, and L represents a line buffer size of the video RAM (an area on the memory in the video RAM corresponding to one line on the display screen), then a leading address A4 of the line on which the cursor is present is obtained by subtracting the remainder of (A3-A1)/L from A3. Consequently, if the standard mode S has the number of lines M, the display start address A2 for the standard mode S is derived from the following equation:

$$A2 = A4 - L \times K,$$

where $$K = (A4 - A1) \times (M/N) \times (1/L) \quad (1)$$

If there are blank lines on the display screen, the leading address A4 corresponds to a line point for the line to which the cursor belongs. Therefore, by obtaining the address of this line pointer, the display start address A2 for the standard mode S may be obtained in the above manner.

When the mode is changed from the standard mode S to the reduction mode R, the display start address may be obtained by substituting (N/M) for (M/N) in the above equation (1).

The display start address thus obtained is set to the display start address register in the display sequencer.

The display sequencer transmits a display start address signal and a signal of the number of lines register to the video RAM 3 through the bus line B, which are then input to the character generator memory 5 through the latch 4, to generate a selected bit pattern with the one character raster address. This bit pattern is subjected to the parallel to serial conversion at the shift register 6 and thereafter is presented on the display 7. The size of the character displayed corresponds to a selected mode, the number of lines equals a number set to the number of lines register, and the display start point is at a position designated by the display start address. The display apparatus having the described construction permits the standard mode S to be selected when a large character size is desirable such as for the input mode and the edit mode, and the reduction mode R to be selected to display a large number of lines for the split screen mode and the help menu mode. Moreover, this apparatus requires only a small load for software and is economical since the switching between the reduction mode and the standard mode is effected by operating the character generator memory 5 and without rewriting the character codes stored in the video RAM 3.

Figure 4:
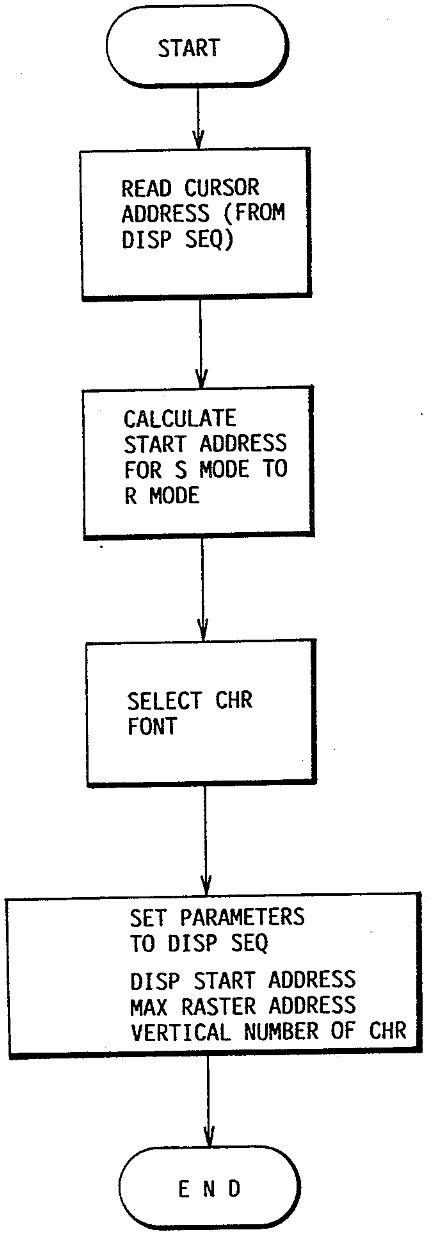
FIG. 4 is a flowchart of an operation for changing from the reduction mode to the standard mode.

FIG. 4 shows a flowchart illustrating the operation of the above display apparatus for changing the mode from the reduction mode to the standard mode.

In particular, FIG. 4 is a flowchart showing the operation executed by the CPU 1 for converting the display from the reduction mode into the standard mode.

At Step 1, when a mode conversion command is input by a mode change key, the address f the video RAM 3 which stores the code data of the character indicated by the cursor on the display 7, i.e., the cursor address A3, is read from the display sequencer 2.

At Step 2, using the above cursor address A3, the display start address in the standard mode is obtained with equation (1) above.

At Step 3, the font select signal is sent to the character generator memory 5 in order to select the character font for the standard mode.

At Step 4, the display sequencer 2 registers are equipped with the display start address, the maximum raster address, and the number of vertical lines. Then the standard mode display is carried out.

Figure 5:
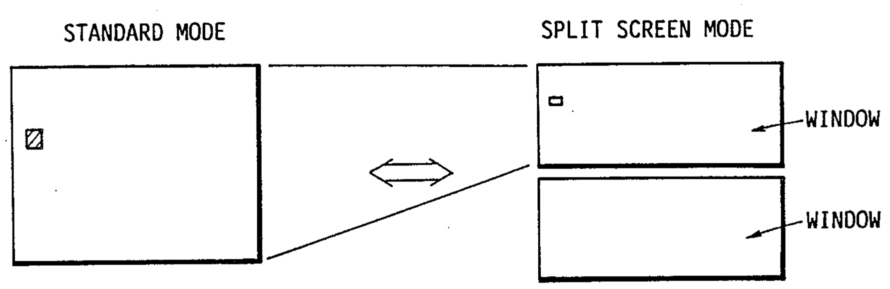
FIG. 5 is an explanatory view illustrating a change on the screen between the standard mode and a split screen mode.

FIG. 5 shows a change on the screen occurring with a mode change between the standard mode and the split screen mode. In this case also, the screen pattern is rearranged between the two modes without changing the relative position of the cursor. More particularly, a cursor position on the screen for the standard mode corresponds to a cursor position in a window (i.e. each divided section formed on the screen) produced in the split screen mode, whereby the operator is free from an extra operation for moving the cursor.

Figure 6:
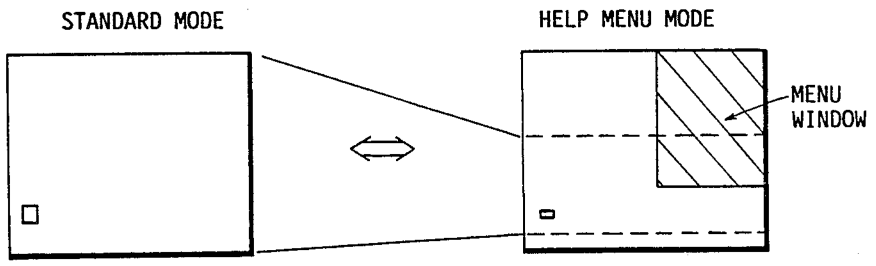
FIG. 6 is an explanatory view illustrating a change on the screen between the standard mode and a help menu mode.

FIG. 6 shows a change on the screen occurring with a mode change from the standard mode to the help menu mode. The help menu mode produces a menu window on a section of the screen (the shaded portion in FIG. 6), and therefore the cursor may be fixed to a position on the screen during the mode change.

Figure 7:
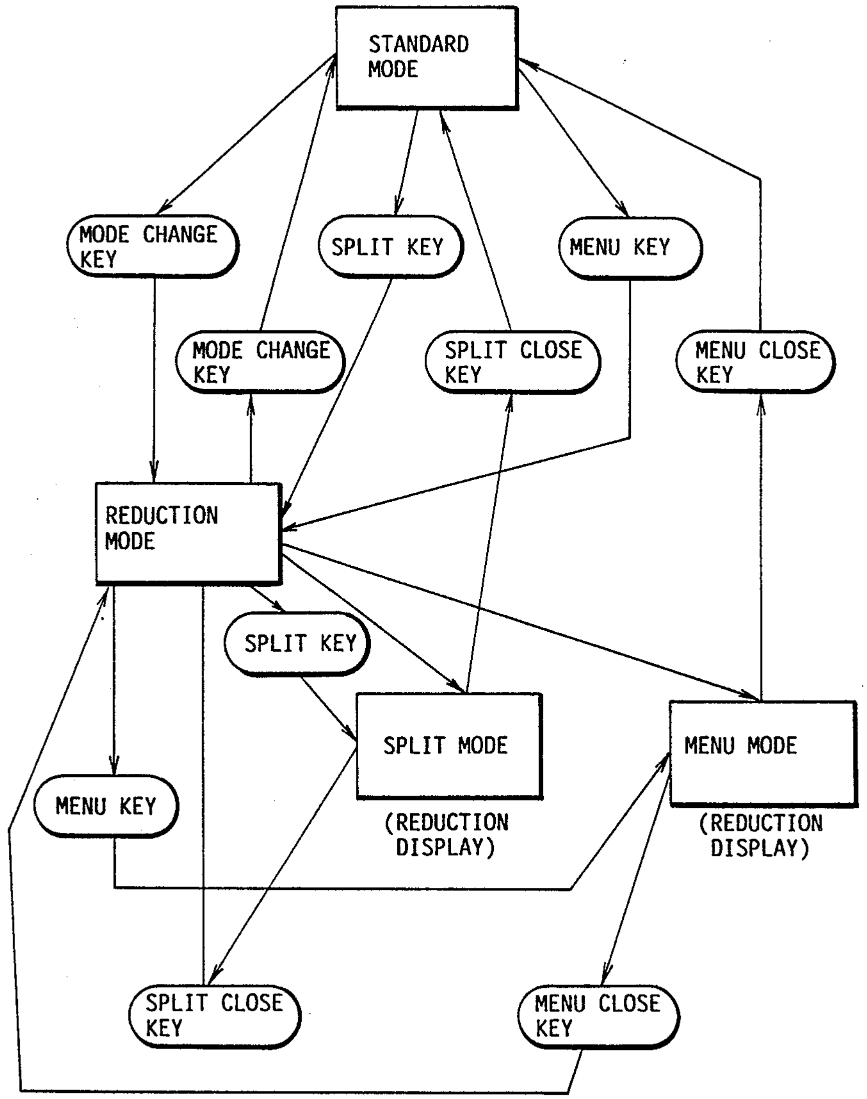
FIG. 7 is a view showing display mode changes.

FIG. 7 is a mode change diagram illustrating the display modes and various input steps for establishing these display modes. Though keys such as a mode change key, a split key and so on are not shown in the drawings so far referred to, these keys are provided on a keyboard belonging to the display apparatus.

In particular, FIG. 7 shows the relationship between the display modes and the input keys. This embodiment has four display modes: standard, reduction, split screen, and help menu. A mode conversion, shown by the arrows in FIG. 7, is executed by operating a particular mode conversion key (i.e., split key, split close key, menu key, or menu close key) while in another mode.

Figure 8:
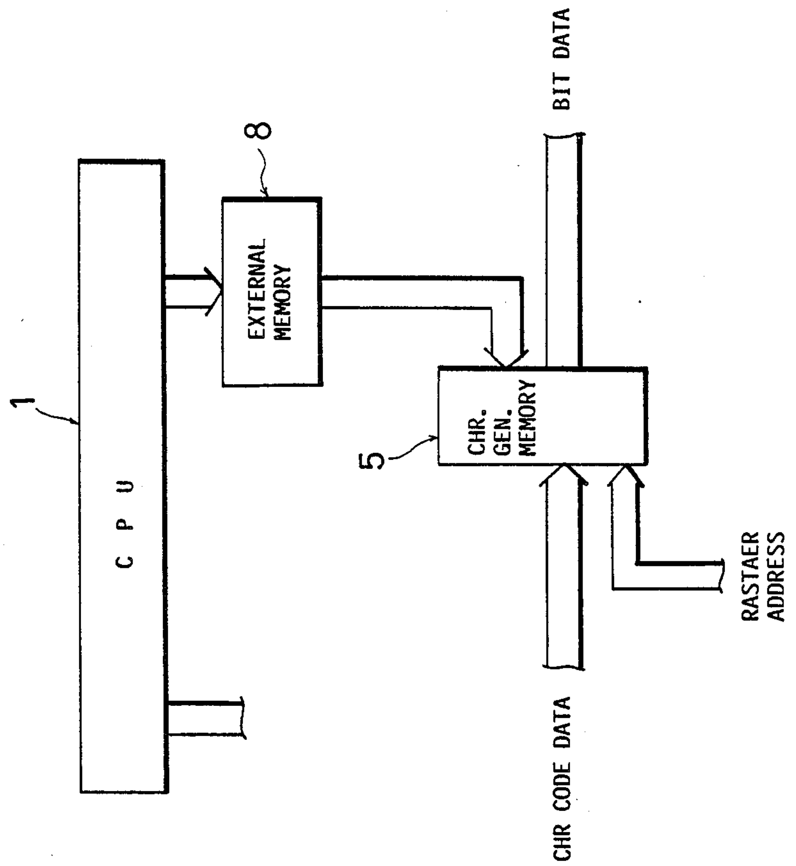
FIG. 8 is a partial block diagram of another embodiment of the present invention.

FIG. 8 shows another embodiment of the present invention. In this example, the character generator memory 5 comprises a RAM to which an external memory 8 such as an external ROM or an external disk storing character fonts is connected. Upon receipt of a command from the CPU 1, the external memory 8 transfers bit data of a selected character font to the character generator memory 5 by high speed transfer such as direct memory access. Thereafter the character data in the character generator memory 5 are rewritten for a selected character size, and the CPU 1 transmits a command to the display sequencer 2 for rewriting the number of lines. The rewriting of the number of lines is carried out in the same sequence as in the embodiment of FIG. 1 and its description will not be repeated. According to this embodiment, when selecting a desired character font, such as a character font for the reduction mode R, this character font may just be transferred from the external memory 8 to the character generator memory 5. This permits the character generator memory 5 to have a small capacity. This embodiment is particularly effective for operating the apparatus with many character font sizes.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A display apparatus for displaying characters in a plurality of display modes, comprising:

storing means for storing text including a plurality of the characters therein;

a display device having a two-dimensional screen for displaying the characters;

character data generating means for generating character data corresponding to the characters in said storing means to be displayed on the screen of said display device;

display mode judging means for judging a display mode to display the characters ȯn the screen wherein the number of character lines displayed on said screen in one of said plurality of display modes is different than the number of character lines displayed in another of said plurality of display modes;

operating means for locating a display start address of said storing means in the display mode judged by said judging means on the basis of the address of the character positioned at a cursor position on the screen, wherein a start character is stored at said display start address; and display device drive means for causing the characters to be displayed from said start character stored in said start address of the storing means which is located by said operating means in the selected display mode on the screen in response to the character data generated by said character data generating means and the display start address located by the operating means.

2. A display apparatus as claimed in claim 1, wherein said character data generating means stores different size character fonts, and wherein one of said character fronts is designated as corresponding to the display mode selected by said selecting means.

3. A display apparatus for displaying characters in a plurality of display modes, comprising:

storing means for storing text including a plurality of the characters to be displayed;

a display device having a two-dimensional screen for displaying the characters;

character data generating means for generating character data corresponding to the characters in said storing means to be displayed on the screen of said display device;

selecting means for selecting or altering the display mode for displaying the characters on said screen;

operating means for locating a display start character in said storing means for the display mode selected by said selecting means on the basis of a character and its position on the screen indicated by a cursor when one of the display modes is selected by said selecting means;

and display device drive means for causing the characters to be displayed from the display start character in the selected mode on the screen in response to the character data generated by said character data generating means and the display start character located by the operating means such that the character indicated by the cursor is located at the same position on the screen in each display mode before and after the altering of the display mode.

4. A display apparatus as claimed in claim 3, wherein said character data generating means stores different size character fonts, and wherein one of said character fonts is designated as corresponding to the display mode selected by said selecting means.

5. A display apparatus for displaying text in a plurality of display modes, comprising:

memory means for storing character codes of characters comprising the text;

a display device having a two-dimensional screen for displaying the text in said memory means;

character data generating means for generating character data from said character codes corresponding to the characters of the text to be displayed on the screen of said display device;

mode selecting means for selecting one of the display modes which includes at least a standard display mode and a different display mode, wherein the number of character lines displayed on said screen in said standard display mode is different from that in said different display mode;

judging means for judging alteration of the display mode from the standard display mode to said different display mode or vice versa by said mode selecting means;

calculating means for calculating a display start address of said memory means based upon an address of the character positioned at a reference position, when said judging means judges the alteration of the display mode, such that the position on the screen of the character positioned at the reference position before the alteration is in the same position after the alteration of the display mode; and display device drive means for causing the characters to be displayed on the screen from the character at the display start address calculated by said calculating means in response to the character data generated by said character data generating means in the selected display mode.

6. A display apparatus for displaying, in various display modes, a part of a text including a plurality of characters, comprising:

means for generating character codes in response to the text;

means for converting said characters generated by said generating means to character font data;

means for displaying the characters of the text in response to the character font data obtained by said converting means;

means for selecting one of the display modes which includes at least a first display mode and a second display mode, and wherein the number of character lines in the first display mode is different than the number of character lines in the second display mode;

means for indicating a display start character of the text, wherein said displaying means displays the characters of the text from said display start character in the display mode selected by said selecting means;

means for obtaining the display start character to be indicated by said indicating means based upon a position of the character on the screen which is indicated by a cursor when the display mode is altered by said selecting means to the first display mode from second display mode or vice versa, and means for operating said displaying means to display the characters of the text in the selected display mode starting with the character indicated by said indicating means in response to the character data generated by said generating means, wherein the character indicated by the cursor is located at the same position on the screen in the first display mode and in the second display mode when the display mode is altered by the selecting means.

* * * * *